United States Patent

[11] 3,568,032

| [72] | Inventors | Karl Mages;<br>Hans Ulli, Kloten, Switzerland |
|---|---|---|
| [21] | Appl. No. | 716,444 |
| [22] | Filed | Mar. 27, 1968 |
| [45] | Patented | Mar. 2, 1971 |
| [73] | Assignee | Elektrodenfabrik Oerlikon Buehrle AG.<br>Zurich, Switzerland |
| [32] | Priority | Sept. 24, 1965, Apr. 21, 1967 |
| [33] | | Switzerland |
| [31] | | 13236/65 and 5699/67 |
| | | Continuation-in-part of application Ser. No. 580,737, Sept. 20, 1966, abandoned. |

[54] METHOD AND APPARATUS FOR ARC-WELDING
30 Claims, 10 Drawing Figs.

[52] U.S. Cl. ................................................ 321/5,
219/131, 321/24
[51] Int. Cl. ................................................ H02m 7/06
[50] Field of Search .................................... 219/131
(R); 321/5, 24, 26

[56] References Cited
UNITED STATES PATENTS

| 2,773,970 | 12/1956 | Galbraith et al. | 321/5X |
| 2,859,398 | 11/1958 | Johnson, Jr. et al. | 321/24 |
| 2,909,647 | 10/1959 | Glenn et al. | 321/24X |
| 3,089,074 | 5/1963 | Vaughan | 321/24X |
| 3,102,976 | 9/1963 | Blair | 219/131(R)X |
| 3,016,484 | 1/1962 | Mulder et al. | 321/24 |
| 3,170,106 | 2/1965 | Rosenstein | 321/5X |
| 3,453,522 | 7/1969 | Ausfeld | 321/5X |

Primary Examiner—William M. Shoop, Jr.
Attorney—Werner W. Kleeman

ABSTRACT: A method and apparatus for arc-welding wherein the welding current delivered to the welding electrode is periodically caused to assume a plurality of essentially different amplitude values, the different amplitude values ensuring control of the formation, release and transport of drops of welding material.

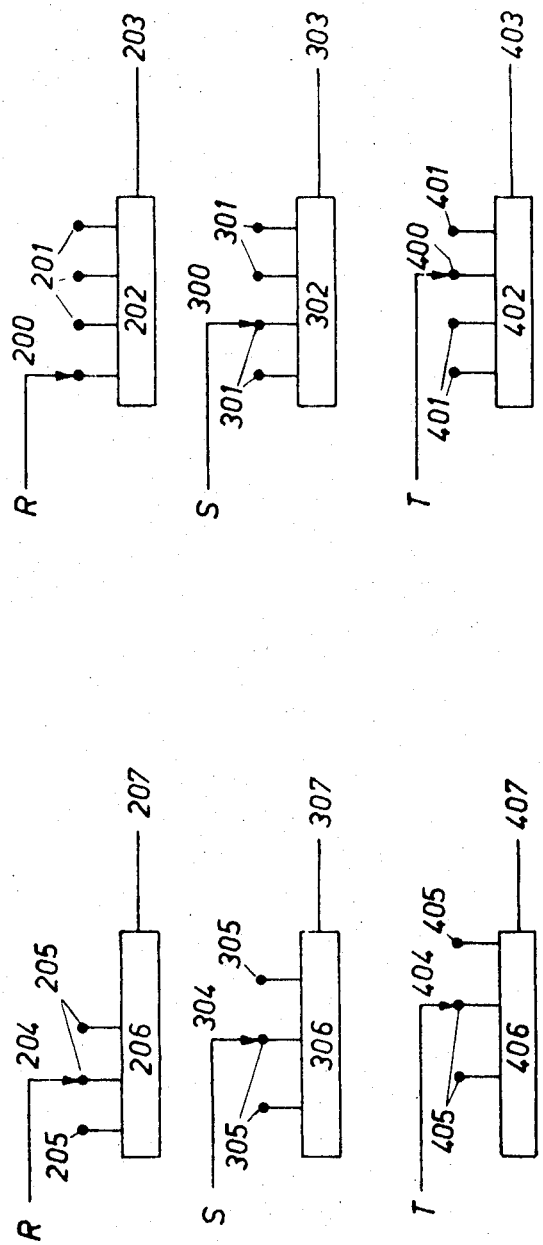

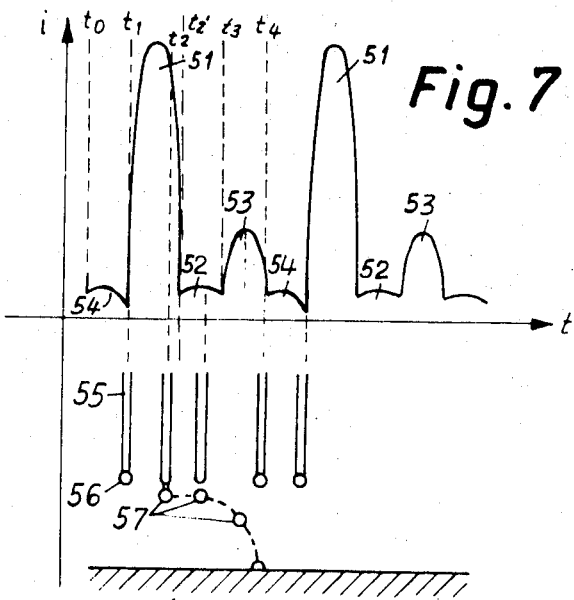
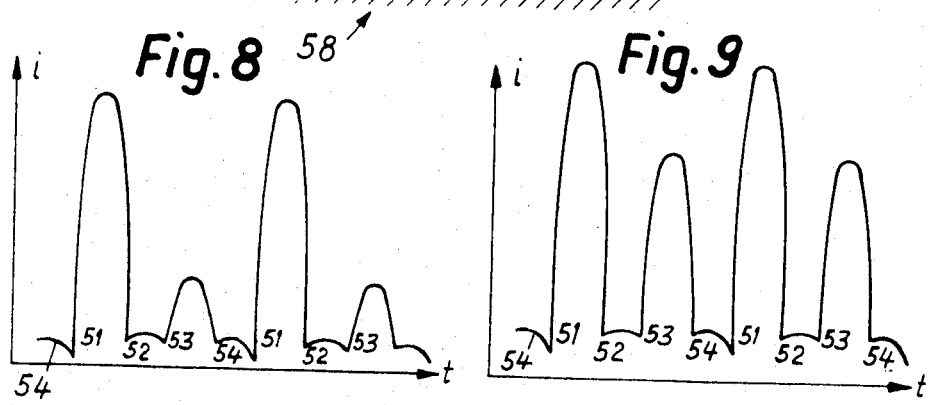
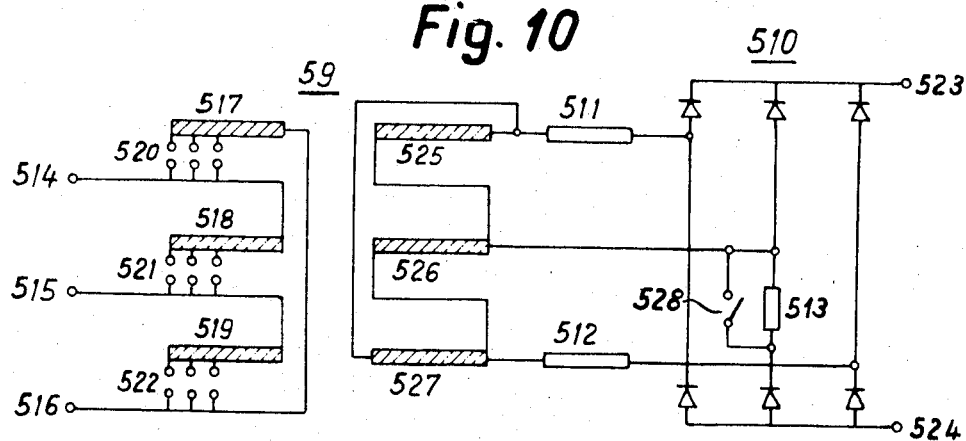
INVENTORS
Hans Ullig & Karl Mayes
BY Jacobi & Davidson
ATTORNEYS

METHOD AND APPARATUS FOR ARC-WELDING

BACKGROUND OF THE INVENTION

This application is a continuation-in-part of U.S. Pat. application, Ser. No. 580,737, filed Sept. 20, 1966.

The present invention generally relates to welding and specifically relates to an improved welding method and apparatus.

With all electric arc-welding processes using consumable or fusible electrodes in which the material transfer takes place in the arc, a transfer or transition of material which is as uniform as possible, is desired. In this regard, welding processes are contemplated which can work with or without gas shielding. The material transfer occurs in the form of drops, the size and number per unit of time of which are dependent upon different factors, such as, for example, the type of electrode, the current load at the electrode, the inductivity of the welding current circuit, the length of the arc, and upon the type of the shielding or protective gas which is used.

Primarily because of metallurgical and economical reasons, it is not possible to readily control all the above-mentioned influencing factors such that a material transfer in the arc with a uniform drop release or deposit frequency with uniform drop size results due to the cooperative relationship of the factors. For instance, when using carbon dioxide ($CO_2$) as a protective or shielding gas during the welding of steel with a continuously consumable or fusible electrode, a more irregular drop transfer must be accepted than would be the case when using pure argon, or a mixture of argon and oxygen, or other known gas mixtures. The advantages which are attained through the use of carbon dioxide, which are generally known to those skilled in the art, are therefore, limited due to an irregular transport of material in the arc, manifesting itself through the increased danger of the formation of pores, bonding defects, increased spatter losses, and irregular appearance of the weld seam.

With shielded arc-welding of aluminum and aluminum alloys, chrome-nickel steels or nonferrous metals, and even when using argon as the protective gas, the same drawbacks exist if welding is to be carried out with minimum specific wire or electrode load, that is, when welding with lower welding currents which are required when carrying out welding operations, for example, upon this thin sheet metal, and with an electrode or tubular wire with smaller diameter. Even when a larger diameter electrode is employed, such thicker electrodes or tubular wires being considerably cheaper than an electrode or tubular wire with smaller diameter, too small a specific current load concomitantly appears. This results in the material drop at the electrode possessing too large a volume before it is released from the electrode and also results in the drop being transported to the welding seam with an irregular drop release frequency.

Similar conditions result during manual welding with sheath-enclosed electrodes or during semiautomatic welding with continuously fed tubular wires as the electrode. When the mass of the electrode sheathing or the filling mass in the tubular wire, for metallurgical reasons, have a composition such that, for example, the surface tension of the drops forming at the end of the electrode is increased, then the drop possesses too large a volume before if it falls from the welding electrode onto the workpiece. This brings about the same disadvantages as with an irregular drop deposit frequency. Hence, pores can form in the weld because of the poor transfer of material at the arc. Apart from this, the spatter losses increase considerably.

A further disadvantage in addition to those already discussed exists with respect to known welding methods and techniques in that such known methods may not ensure satisfactory material transfer at the arc during so-called out of position welding such as vertical or overhead welding, and particularly with low specific current loading of the electrode. For example, with the known MIG-welding, a very high specific current loading of the electrode must always be provided in order to ensure acceptable transfer of material from the electrode to the workpiece. Because of this high specific current loading, these known methods are even quite limited in their applications. Improvements, though, are known in the art which tend to reduce, though not eliminate, this specific drawback, one such improvement comprising a welding method with pulsating welding current, the welding current pulsating with the applied network frequency. These improvements are not sufficient since optimum material transfer at the pulsating arc is not present throughout the entire range of the possible current loading of the different electrode types and diameters. The network frequency utilized is normally too low to obtain faultless and uniform material transfer per impulse with an intermediate current loading of the electrode. In particular, the so-called "weak current" time interval which naturally follows the "strong current" impulse in the pulsating welding current methods exhibits such small forces within the arc that detached material is not accelerated from the end of the electrode to the workpiece. Thus material transport in the arc is difficult when the welding takes place out of position. Faultless and uniform material transfer in this situation cannot be achieved by an extreme increase of the so-called "strong current" impulse of the arc, since with such an increase, a "hard" arc results whereby the undesired spatter effect discussed above is considerably increased. Additionally, the desired minimum current intensity (average value) would not be obtained by such current increase and the spatter effect, of course, causes impairment of the weld in known manner. Apart from this, the quality of such a weld is no longer ensured. Further still, when utilizing these known methods, it is quite difficult to correctly adjust the momentary electrical welding parameters (base or weak voltage and impulse or strong voltage). For normally trained operating personnel, welding data tables must be consulted so as to optimumly set the two electrical values or parameters which mutually influence one another and which are necessary for each welding operation.

According to still further known pulsating current methods, the current impulses are generated with a higher frequency than the normal network frequency. In so doing, the welding current has the same sequence or course ("weaker current" and "stronger current" time periods) as with the above-mentioned method. Both methods, as is apparent, differ from one another only in the repetition frequency of the impulses and therefore, the above-mentioned drawbacks relative to out of position welding cannot be eliminated.

Accordingly, it is a primary object of the present invention to provide both a welding method and apparatus which overcomes all the above-mentioned drawbacks associated with prior art techniques.

It is another object of the present invention to provide an improved apparatus by means of which, during arc-welding with or without gas shielding, it is possible to substantially control or influence the drop release frequency and the size of the drops of the welding material such that substantially improved quality of the weld is obtained.

Another considerably object of the present invention is to provide an improved apparatus for arc-welding which, not withstanding metallurgical or economical limitations, still avoids the occurence of unfavorable conditions at the arc.

Still a further noteworthy object of the present invention has reference to an improved welding rectification arrangement for arc-welding which ensures a more uniform release frequency of the drops from the welding electrode and a substantially constant size of these drops.

A further object of the present invention resides in the provision of an improved power supply system for welding equipment which manifests itself through the use of simple and inexpensive electrical components by means of which it is possible to effect control of the size of the drops of the welding material and the drop release frequency from the welding electrode.

Yet another object of the present invention is to ensure optimum transfer of material in an arc with specific current loadings of the electrode being lower than that obtained with prior art techniques.

Another object of the present invention is to provide a welding technique and apparatus suitable for improved use with both in position and out of position welding and both with and without gas shielding and on both thin and thick sections.

A further significant object of the present invention relates to the provision of an improved welding technique and apparatus which can provide for acceleration of welding material in the arc in the interval between the series of main pulses.

Another object of the present invention is to ensure free drop transfer of material without creating a short circuit during intermediate current loading of an electrode by adjusting the drop release frequency to thus obtain equilibrium between the supply of molten material and the transport thereof in the direction of the welding bath.

Still another object of the present invention resides in the simplification of the operation of equipment for regulating the electrical parameters of the welding arc in that provisions are made to achieve such regulation by the adjustment of only one welding voltage.

SUMMARY OF THE INVENTION

Now, in order to implement these and still further objects of the invention which will become more readily apparent as the description proceeds, the invention contemplates the provision of both a novel welding method and apparatus. The method of the present invention is generally manifested by the features that the welding current delivered to the welding electrode is periodically caused to assume a plurality of essentially different amplitude values which may take the form for example, of a series of base amplitudes, auxiliary amplitudes and main or primary amplitudes. The various current amplitude values are cyclically repeated throughout a welding operation and can bring about versatile control over the welding characteristics.

In one application thereof, the inventive method is contemplated to be utilized to produce a preferred current waveform at the welding electrode from which inure certain advantageous welding characteristics. This preferred current waveform is contemplated to comprise three essentially different amplitude valves in the form of a base amplitude, an auxiliary amplitude, and a main or primary amplitude, the order of occurence of these essentially different amplitude valves being such that an initial base amplitude is provided, followed by an auxiliary or larger amplitude, which is, in turn, followed by another base amplitude and then by a main or primary amplitude current pulse. By suitable control over the average current loading of the welding electrode, the frequency of the welding current and other electrical parameters of the welding circuit, the burning arc is no longer continuously maintained at the electrode end during the occurence of at least one of the base amplitudes, and during both base amplitudes no appreciable fusing or melting of the material occurs. 'n practice, the magnitude of the current level during the presence of the base amplitudes is chosen to lie in the range of 2 to 25 amperes. By the same taken, the subsequent larger auxiliary amplitude can serve to fuse at least a portion of the material for subsequent release and can serve to accelerate in the direction of the welding bath, independently of the welding position, the material drop of a previously occuring drop release which is still located in the welding arc. Further after the second base amplitude for example, a main or primary amplitude welding current is provided during which time further material is molten and is generally released in the form of essentially one controlled drop from the electrode end and in substantial synchronism with this pulse.

Apparatus is provided in accordance with the subject invention for carrying out the inventive method and effecting versatile control over the welding characteristics. The apparatus of the present invention in one preferred form thereof is generally manifested by the features that a transformer system is provided having a plurality of output phases connected to a full-wave rectifier group which produces individual half-wave outputs for each phase thereof. Means are provided for each phase of the transformer means or system which may be adjustable independently from one another so as to regulate a desired amplitude relationship between the individual half-waves. Thereafter, impedances may be provided for each phase which can be varied independently of one another so as to influence the form or shape of the half-waves and/or for influencing or limiting the current amplitude. Accordingly, a welding current can be obtained at the electrode having a plurality of essentially different amplitude values and forms which can be used to great advantage.

The inventive apparatus, in a second preferred embodiment thereof is characterized by the features that an impedance is arranged in at least "$n$ minus 2" of the transformer output phases carrying the welding current. A disconnectable impedance is further provided in at least one branch of the rectifier group which conducts the half-wave current. These impedances can be dimensioned and adjusted in such a manner that the waveform of the welding current is such as to bring about the desired versatile operational characteristics, including the possibility of having a desired frequency selection.

BRIEF DESCRIPTION OF THE DRAWINGS

The inventive method and the preferred embodiments of the inventive apparatus to carry out the inventive method will become more readily apparent when reference is given to the following detailed description thereof taken in conjunction with the appended drawings, wherein:

FIGS. 4, 5 and 6 depict further modifications of details of the preferred embodiments of the welding apparatus of the present invention;

FIG. 7 depicts an illustrative current waveform applied to the welding electrode in accordance with the inventive method of the subject application, with preferred material release and transfer at the welding arc as a function of time being shown beneath this curve;

FIG. 8 is a graph showing another typical illustrative waveform for a low average welding current value at the electrode in accordance with the method of the present invention;

FIG. 9 is a graph depicting a further typical illustrative current waveform obtained at a higher average welding current level in accordance with the alternative method of the present invention; and FIG. 10 is a circuit diagram of a second preferred embodiment of the welding apparatus constructed in accordance with the subject invention.

DETAILED DESCRIPTION OF THE PREFERRED EMBODIMENTS

Figure 1:
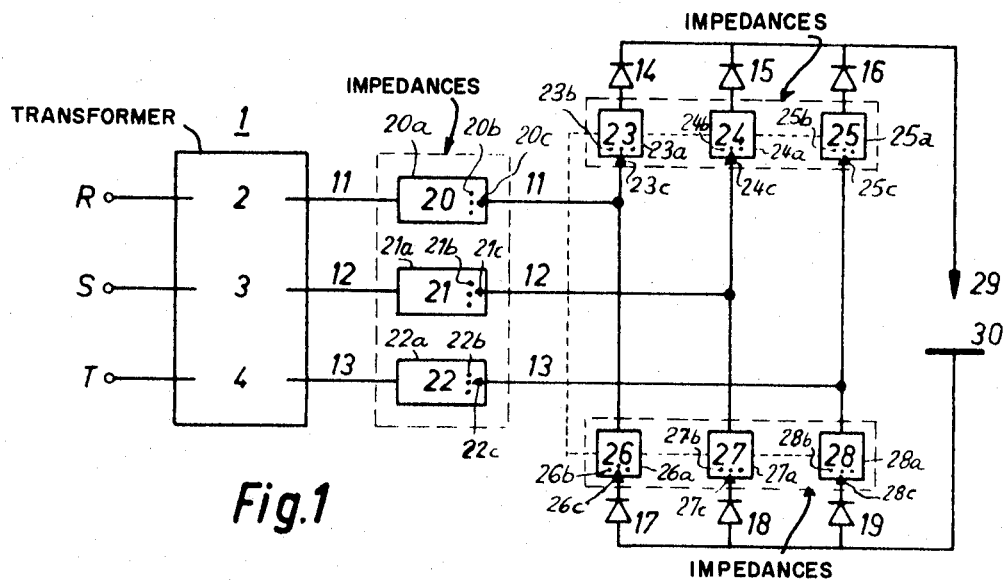
FIG. 1 schematically depicts a circuit diagram of a first preferred embodiment of welding apparatus constructed in accordance with the instant invention.

Describing now the drawings, in FIG. 1 a first preferred embodiment of the inventive apparatus is depicted, this apparatus carrying out the inventive method discussed above. A three-phase network is provided having the three phases R, S and T which feed a polyphase or three-phase transformer means or system 1. In this three-phase transformer means 1, the transformer ratio or transformer winding ratio of the input voltage to the desired welding voltage is regulated. In FIG. 1, by means of the reference numerals 2, 3 and 4 for each phase R, S and T respectively, of the three-phase transformer means 1, there has been schematically represented the means for regulation of such transformer winding ratio. As will be more fully developed hereinafter, there can thus be obtained voltage amplitudes of different magnitude far each phase, illustrative half-wave amplitudes being shown in the graph of FIG. 3. It is to be noted, however, that the actual voltage obtained from each transformer phase comprises a full-wave form of both the positive and negative half-cycles.

Figure 3:
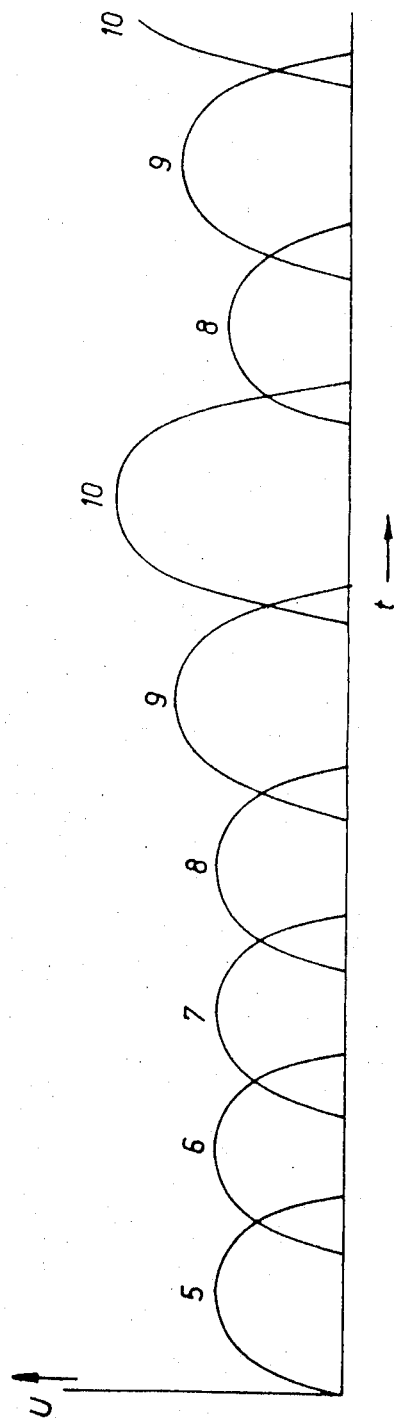
FIG. 3 is a graph partially illustrating the voltage waveforms that can be produced by the inventive apparatus for explanatory purposes.

Now, with known arrangements, the transformer winding ratio is always regulated such that the three half-wave amplitudes 5, 6 and 7 possess the same height or magnitude. However, with the first embodiment of the apparatus of the invention, the transformer winding ratio, in each phase, is regulated differently and independently from one another so that, again as shown in FIG. 3, the illustrative half-wave amplitude 8 which is associated with the phase P may possess a normal magnitude or size, and the illustrative half-wave amplitudes 9 and 10 associated with the other phases S and T may be greater in magnitude. This relationship can be maintained throughout the entire welding operation or varied as desired. In this manner, controlled drop transfer of welding material from the welding electrode can be obtained by virtue of the resultant current waveform at the electrode derived from these illustrative voltages of each transformer phase. The relationship between the amplitudes of the illustrative voltage half-waves, however, may, as stated above, also be regulated differently from that shown in FIG. 3 by reference characters 8, 9 and 10. For example, the half-waves 8 and 9 could possess a normal size and the half-waves 10 could be made more pronounced or stronger. Other regulation of the half-wave sizes can also be produced in dependence upon the momentary welding operation as will be apparent hereinafter to bring about differing welding current waveforms and desired operational modes, welding techniques and results.

As will now be more fully explained, the means 2, 3 and 4 arranged in the polyphase or three-phase transformer means 1 for the regulation of a previously predetermined amplitude relationship between the illustrative individual half-waves of the welding voltage can be in the form of taps, if so desired, which are applied to each individual primary winding of the aforesaid transformer means 1. These taps are arranged such that they divide the primary windings into the same (FIG. 4) or different (FIG. 5) number of turns. Specifically in FIG. 4 the primary windings 202, 302, and 402 of the transformer means 1 are provided with taps 201, 301 and 401 respectively. These taps 201, 301, 401 are associated with the same number of turns in each primary winding 202, 302 and 402 respectively. A switch means or wiper 200, 300 and 400 is provided for each primary winding 202, 302, and 402 respectively, and further, is electrically coupled with the respective phase R, S and T, as schematically shown. The outputs of the primary windings 202, 302 and 402 of the transformer means 1 are designated by reference numerals 203, 303, 403 respectively. The taps 201, 301 and 401 are optionally or selectively connected with the switch means 200, 300 and 400 respectively. In this manner there can be selected a predetermined number of turns and, therefore, a predetermined transformer winding ratio. Such selection takes place in each primary winding 202, 302 and 402 independent of the other two primary windings. The individual regulation is undertaken such that a different transformer winding ratio is present in each primary winding 202, 302 and 402. In this manner, it is possible to obtain the shape or form of the voltage, as such is shown in FIG. 3, by the half-waves 8, 9 and 10 or other desired shapes.

In FIG. 5, there are depicted three primary windings 206, 306, 406 provided with taps 205, 305, 405 respectively, which can be selected by means of the switches or wipers 204, 304 and 404 respectively. As shown, these switches 204, 304, and 404 are coupled with the phases R, S and T respectively. Reference numerals 207, 307, 407 designate the outputs of the primary windings 206, 306 and 406 respectively. The taps 205, 305 and 405 divide each primary winding 206, 306 and 406 respectively, into sections with unequal number of turns. As clearly shown in FIG. 5, the switches 204, 304 and 404 are set at the central taps. By virtue of the different number of turns in each primary winding 206, 306 and 406 there exists a different transformer winding ratio for each primary winding. In this case, the switches or wipers 204, 304 and 404 could be adjusted by means of a common adjustment knob or equivalent expedient. Once again, there appears the illustrative form or shape of the voltage waveform such as shown in FIG. 3 with the explanatory half-waves 8, 9 and 10.

With this stepwise adjustment of the transformer winding ratio according to FIGS. 4 and 5, it is further contemplated that when a different transformer winding ratio has once been adjusted for each phase resulting in the voltage amplitudes represented in FIG. 3 by the half-waves 8, 9 and 10, for example, an increase of all amplitudes of these half-waves by the same voltage increment can be achieved through simultaneous adjustment of the switch means through the same amount. In this regard, the initially regulated relationship between the individual half-waves remains constant.

Figure 6:
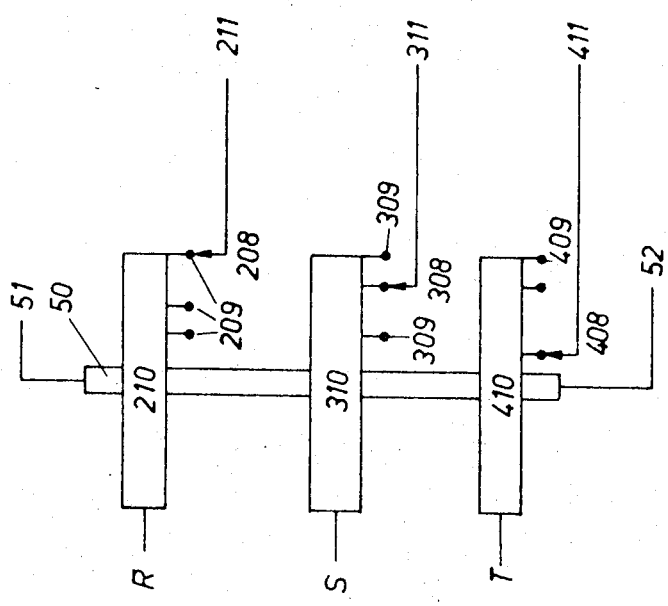

Up to now, there has been described and considered the stepwise regulation of the transformer winding ratio for each primary winding 202, 302, 402 and 206, 306, 406; in other words, the stepwise adjustment of the relationship between the amplitudes of the half-waves for all phases. However, a stepless or infinite adjustment of the transformer winding ratio in each primary winding and, therefore, an infinite adjustment of the relationship between the amplitudes of the illustrative half-waves for all phases can be attained through the arrangement of a working or operating winding of a transductor at each primary winding of the transformer means 1. Such an arrangement is depicted for instance in FIG. 6, to which attention is now invited. Here, each of the working windings 210, 310 and 410 is coupled with one of the phases R, S and T, as shown. Each such working winding 210, 310 and 410 is provided with taps 209, 309 and 409 respectively, providing sections with nonuniform or different number of turns. The switch means or wipers 208, 308 and 408 select the desired taps 209, 309 and 409 respectively. The outputs 211, 311 and 411 of the switch means 208, 308 and 408 respectively, lead to the nonillustrated primary windings of the transformer means 1 of FIG. 1. A control winding 50 influences all three working windings 210, 310 and 410. The terminals 51, 52 of this control winding 50 are coupled with a suitable control voltage source. The control winding 50 can, however, also be connected by means of its terminals 51 and 52 into the welding current circuit such that welding current flows therethrough. By appropriately influencing the working windings 210, 310 and 410 via the control winding 50 it is therefore possible to achieve the same thing as with the arrangement of FIGS. 4 and 5. The amplitudes of the half-waves 8, 9 and 10 of FIG. 3 are thus the result of this infinite adjustment of the transformation ratio. Again, the half-waves can also have a different amplitude relationship from that shown in FIG. 3.

It should be clearly apparent that the means for the stepwise or stepless adjustment of a previously predetermined amplitude relationship between the individual illustrative half-waves can also be arranged in the secondary winding means of the transformer means 1. In this regard, there appear the same conditions or relationships as previously described.

Having now had an opportunity to consider the foregoing, attention is again invited to FIG. 1 depicting therein a first embodiment of the inventive apparatus wherein impedances 20, 21 and 22 are arranged at the conductors 11, 12 and 13, respectively, leading to the rectifier means 14 to 19. These individual impedances 20, 21 and 22 are saturable reactances comprising, for instance, choke coils with particle oriented-laminated cores, as generally designated by reference characters 20a, 21a and 22a, respectively. Further, they possess taps 20b, 21b and 22b which divide the associated coils, similar to FIG. 4, into sections with predetermined number of turns. These taps 20b, 21b and 22b can be selected by means of appropriate switches or wipers 20c, 21c and 22c, respectively. However, the coils of the impedances 20, 21 and 22 could also consist of a respective working winding of a transductor. The size of the impedance value can thus either be adjusted stepwise by means of switches, as just considered, or in stepless fashion by transductors, as previously explained. The individual impedances 20, 21 and 22 have the function of limiting the current amplitude. Stated in another way, because of these impedances 20, 21 and 22, there results a static average current/voltage curve with descending characteristic as desired for manual welding operations. With shielded arc-welding with continuously advanced wire electrode or with semiautomatic welding without gas shielding there is desired a static average current/voltage curve with a flat characteristic. In this case, the value of the individual impedances 20, 21 and 22 can be adjusted to null, so that the flat characteristic of the static average current/voltage curve, which is determined by the transformer means 1, is fully effective during the welding operation. As will be apparent, suitable relative adjustment of these impedances 20, 21 and 22 can effect control over the illustrative half wave voltages 8, 9 and 10 of FIG. 3 in lieu of using variable transformer windings.

In the conductors 11, 12 and 13, in the region of the rectifiers 14 to 19, there can be arranged in groups further individual impedances 23, 24, 25 and 26, 27, 28. These individual impedances are likewise saturable reactances consisting for example of choke coils with particle oriented-laminated cores, as generally designated by reference characters 23a, 24a, 25a and 26a, 27a, 28a. Once again, these impedances also possess taps 23b, 24b, 25b and 26b, 27b, 28b, respectively, with the same or different number of turns, similar to what has been explained in connection with FIGS. 4 and 5. These taps 23b to 28b are connectable with adjustable switches or wipers 23c to 28c respectively, so that the desired number of turns, and therefore, the value of the reactance can be regulated in stepwise fashion. Here again, the impedances 23 to 28 can also consist of working windings of transductor means, which through the action of control windings permit a stepless or infinite adjustment. By means of each impedance, it is possible to influence the form or shape of the illustrative half-waves and, of course, the full cycle waveform in each phase independent of one another. Under the term "influencing the form or shape of the half-waves," there is to be understood that the sinus-shaped half-waves of FIG. 3 have imparted thereto a steeper ascent since the third harmonic oscillation is made more pronounced or accentuated through the impedance. In this manner, each half-wave can individually receive or have imparted to it a steeper ascent. Also, all of the half-waves could have imparted thereto a steeper ascend. By appropriate regulation of these impedances it is possible to adjust the degree of steepness of each half-wave individually. The steep form or shape, in other words, the nonsinusoidal shaped half-wave, is advantageous from the standpoint of a good release of the drops from the welding electrode 29. These individual impedances can either collectively for both groups 23, 24, and 25 and 26, 27 and 28 be changed, or only changed in one group 23, 24, 25 or 26, 27, 28, or each can be changed individually. In this manner there is provided a number of possibilities for imparting to the sinus-shaped half-waves 8, 9 and 10 a more or less pronounced steepness. The welding current appearing at the electrode 29 and the workpiece 30 thus can be controlled to have a waveform which can be accommodated to virtually any welding.

The previously described possibilities are not limited solely to a specific construction of a polyphase or three-phase transformer system or means 1. This transformer means 1 can also, for instance, consist of three single phase transformer means.

Figure 2:
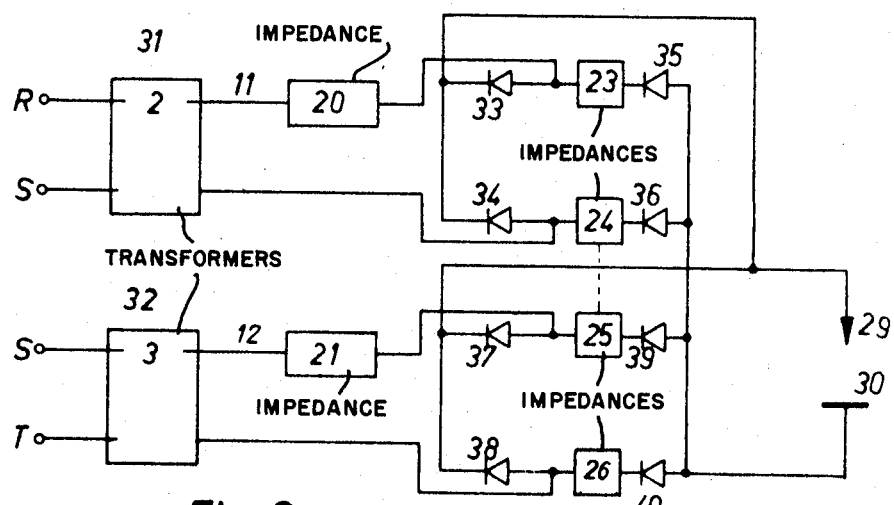
FIG. 2 schematically depicts a modified circuit diagram of the first embodiment of welding apparatus constructed in accordance with the instant invention.

FIG. 2 depicts a modification of the first preferred embodiment of the present inventive apparatus which is significant in this last-mentioned respect. Here, the main difference from the previously described embodiment resides in the fact that only two individual transformer means 31 and 32 are provided, wherein each is supplied by different phases R, S and S, T of the polyphase network. Both supply voltages are phase displaced at least 30° with respect to one another. Each transformer means 31 and 32 has in its primary winding or secondary winding the previously considered means 2 and 3, respectively, for the adjustment of the amplitude relationship between the individual half-waves 8, 9 and 10.

In the conductors 11 and 12 leading to the rectification bridge arrangement or circuit 33 to 40, there are arranged impedances 20, 21 and 23, 24, 25, 26. As far as construction and mode of operation is concerned, such is the same as that which was considered with respect to the embodiment of FIG. 1. Moreover, the structure described with regard to FIGS. 4, 5 and 6 can also obviously be employed with the embodiment of FIG. 2.

Turning now to FIG. 7, an illustrative, simplified waveshape of the resultant output welding current is depicted. The top and bottom illustrations in FIG. 7 show the correlation of the welding current $i$ as a function of time and the material transfer which can be produced between the electrode and the workpiece in accordance with preferred mode of operation. Along the ordinate of the upper illustration, the current intensity $i$ is plotted along the abscissa, the time $t$ is plotted. The base amplitude 54 starts at the period of time $t_0$. Following such, at the time period $t_1$, is the main amplitude 51 which exists until the period of time $t_2'$. The main amplitude 51 has a considerably higher intensity than the base amplitude 54. The base amplitude 52 begins at the period of time $t_2'$ and lasts until $t_3$. The base amplitude 52 can possess approximately the same intensity as the base amplitude 54. The auxiliary amplitude 53 follows the base amplitude at the period of time $t_3$ and lasts until the period of time $t_4$. Now a new cycle begins which is composed of the base amplitude 54, the main amplitude 51, the base amplitude 52 and the auxiliary amplitude 53. Thus a work cycle lasts from the time period $t_0$ until the time period $t_4$.

It has been found when operating at 50 cps that the relationship of the peak value of the main amplitude pulse and the subsequent base amplitude can be varied in the range of about 2.5 to 10, the relationship of the peak value of the auxiliary amplitude and its preceding base amplitude in the range of about 1.2 to 7, both relationships being a function of the specific current loading of the individual electrode types and diameters.

In the illustration appearing below the graph of FIG. 7, it will be seen that a portion 56 of the material has already fused or melted at the end of the electrode 55 at the time period $t_1$-—*at the beginning of the main amplitude 51. During the time interval $t_1$ to $t_2$, still further material may be fused because of* the action of the main amplitude 51, so that no later than the time period $t_2$, the material 57 is normally released in the form of a controlled drop from the end of the electrode 55. This is represented by the broken line between the upper graph and the lower illustration of FIG. 7. During the duration of the subsequent base amplitude 52 between the time periods $t_2$ and $t_3$, the material 57, in droplet form, is on its way between the electrode 55 to the workpiece 58. During this time, the welding current intensity can be constrained so low that practically no further melting of material at the end of the electrode 55 takes place. During the appearance of the subsequent auxiliary amplitude 53 in the time period $t_3-t_4$, the material droplet 57 normally is accelerated in the direction of the workpiece 58, and, at the same time, further material is melted at the electrode. Thereafter the same work cycle begins. It is to be understood that different current waveforms can be produced as desired and that the above-described waveform and operation is only illustrative as different characteristics can be produced by varying the average current loading of the electrode, the inductivity in the welding circuit, the frequency of the current and the electrode characteristics. Thus, the versatile advantages of the inventive method, and apparatus should be apparent.

A comparison of FIGS. 8 and 9 shows the self-regulating effect. In FIG. 8, there is shown as an example, the ratio of the peak value of the main amplitude 51 and the base amplitude 52 as about 10:1. The ratio of the peak value of the auxiliary amplitude 53 and the base amplitude 52 is represented as about 3:1. The ratio of the peak value of the base amplitudes 52 and 54 is shown approximately as 1:1. Further, it will be recognized from FIG. 8 that, during the period of at least one of the base amplitudes, for example base amplitude 54, the welding current is lowered for a short period of time to such a value at which it is no longer sufficient for maintaining a continuously burning arc. These conditions or ratios are typical examples for a specific low current loading of the electrode 55. In so doing, a good transfer of material results which is generally carried out synchronously with the main amplitude 51 described in connection with FIG. 7.

Now, if welding is to be carried out with an intermediate specific current loading of the electrode 55, which can merely be obtained by changing the welding voltage and the wire feed, then, there is obtained, for example, a ratio of the peak value of the main amplitude 51 and the base amplitude 52 of about 7:1, as shown in FIG. 9, and the ratio of the peak value of the auxiliary amplitude 53 and the base amplitude 52 of about 5:1. This automatic adjustment of the new ratios for intermediate specific current loading of the electrode 55 can be readily obtained by appropriate adjustment of the welding voltage and regulation of the wire feed. The latter will be more fully described in connection with FIG. 10. At this point, however, it must be mentioned that, because of the arrangement of the impedances in the secondary alternating current-conducting phases of the apparatus of FIG. 10, the automatic adjustment of the different ratios between the peak values of the main amplitude 51 and the base amplitude 52 as well as the auxiliary amplitude 53 and the base amplitude 52 takes place automatically. Naturally, the peak value of the base amplitude 54 changes analogously with the peak value of the base amplitude 52. It is for these reasons, and as will be more fully described later, that these impedances are likewise formed of oriented-grain sheet metal cores. With still higher specific current loadings of the electrode 55, the relationship changes still further, as such has been depicted in FIG. 9.

FIG. 10 illustrates a second preferred embodiment of the inventive apparatus which is particularly suitable to produce the illustrative welding current waveforms of FIGS. 7, 8 and 9. This apparatus comprises a transformer system 59 and a rectification arrangement 510 with intermediately connected impedances 511, 512, 513 as shown. The network voltage for the system is applied to the terminals 514, 515, 516. Taps 520, 521, and 522 are provided at the primary windings 517, 518 and 519 of the transformer system 59. These taps 520, 521 and 522 serve for changing the transformation conditions of the transformer system 59 and, therefore, for changing the output voltage of the entire apparatus at the terminals 523, 524. In the illustrated embodiment, taps 520, 521 and 522 may be utilized to simultaneously change the amplitude of the output voltage of each phase which can be equal in magnitude to one another. The secondary windings 525, 526 and 527 of the transformer system 59 are, for instance, connected in delta arrangement and magnetically coupled with the primary side of the system. The structural arrangement of the apparatus of FIG. 10 includes the impedances 511, 512 and 513 as shown. Because of the impedance arrangement, a variable amplitude relationship can be achieved between each output phase such as illustrated by the illustrative half-wave amplitudes 8, 9 and 10, FIG. 3. These impedances, 511, 512, 513 are dimensioned in such a manner that the peak value of the individual amplitudes assume the already mentioned relationships and thus insure an optimum and uniform material transfer from the electrode 55 to the workpiece 58. A switch 528 is connected in parallel with the impedance 513. The function of this switch 528 is as follows:

When the switch 528 is open, as shown in FIG. 10, then each second half-wave voltage of that phase which can produce the main amplitude 51 is weakened or lowered. This lowered amplitude value automatically represents the auxiliary amplitude 53. In this instance, there can appear at the outputs 523, 524 or between the electrode and the workpiece, a main amplitude 51 and the auxiliary amplitude 53 with the network frequency which is applied to the terminals 514, 515, 516, for instance, 50 cps. When the switch 528 is closed, that is to say impedance 513 is shunted, there appears at the terminals 523 and 524, and therefore at the electrode and at the workpiece a main amplitude 51 with twice the network frequency, for example, at 100 cps. In this case, the intermediate portion of the base amplitudes 52 and 54 is increased to the auxiliary amplitude. The new amplitude curve contains—viewed as a function of time—essentially only main and auxiliary amplitudes since the intervals of the base amplitudes 52, 54 are reduced to a very short time. With the previously mentioned increased frequency, which can be adjusted in desired multiples, an optimum condition is obtained for higher current ranges and higher specific wire loading. Because of the increased material supply, a shorter time sequence of the main and auxiliary amplitudes is also desired. The time intervals, as desired, accordingly almost disappear during which intervals practically no material may be melted or fused. The explained sequence of the current waveforms for both frequencies can be advantageously achieved by utilizing grain-oriented sheet metal as the cores of the impedances 511 and 512.

The impedances 511 and 512 may be adjustable and are contemplated to comprise inductive reactors with an ohmic operating portion, such as for instance choke coils. It is also contemplated to construct these impedances as LC circuits in the form of series-resonant or parallel-resonant circuits. Naturally, these impedances 511 and 512 could also be constructed as capacitive reactors, for instance, capacitors. As a result, there can be obtained a time-displacement of the individual amplitudes with respect to one another. Only one of these impedances is preferably constructed as a primary capacitive reactor, so that only one amplitude is displaced in time. Furthermore, both impedances or only one of them could be constructed as a transductor. The impedance 513 which is arranged in the branch of the rectification assembly 510 which conducts the half-wave current, can be constructed as a primary inductive reactor, or in the form of a transductor. It is also contemplated that this impedance 513 can be an infinitely variable purely ohmic resistor, for instance, a potentiometer. Due to this special construction of the impedance 513, it is possible to vary the formation or development of the auxiliary amplitude 53. Consequently, there results a change of the average output voltage at the terminals 523 and 524. Naturally, this effect can only be utilized if the switch 528 is open, that is to say, when the impedance 513 is coupled into the current circuit.

The described embodiment according to FIG. 10 can be readily replaced by similar components. Thus, for instance, the transformer system 59 could be replaced by a polyphase generator. Naturally, the diodes which have been shown in FIG. 10 at the rectifier arrangement 510 could be replaced by controlled rectifiers—so-called thyristors. In so doing, it is possible to obtain a very favorable voltage regulation within narrow limits, without the amplitude relationship of FIG. 7 to 9 being appreciably changed. Additionally, transductors could be connected in series with the primary windings 517, 518 and 519.

In view of the above, it should now be apparent that the objects initially set forth at the outset of this specification have been successfully achieved.

We claim:

1. A welding rectification arrangement comprising transformer means having a plurality of inputs and outputs, at least said outputs being of different phase, rectifier means coupled with said transformer means to produce half-wave outputs for each output phase, means provided for each phase of said transformer means which are regulatable independently of one another for adjusting a previously predetermined asymmetrical amplitude relationship between the individual half-wave outputs, and impedance means coupled with each output phase, said impedance means being variable independently of one another for alternatively influencing the shape of the half-wave outputs, for limiting the current amplitude, and both.

2. A welding rectification arrangement as defined in claim 1, wherein said transformer means comprises single phase transformers.

3. A welding rectification arrangement as defined in claim 1, wherein said transformer means comprises at least one polyphase transformer.

4. A welding rectification arrangement as defined in claim 1, wherein said transformer means incorporates primary winding means provided with selectable taps, said means for adjusting the amplitudes of said half-wave outputs comprising switch means capable of being selectively coupled with given ones of said taps for changing independently of one another the transformer winding ratio for the voltages in each transformer phase.

5. A welding rectification arrangement as defined in claim 1, wherein said means for adjusting the amplitudes of the half-wave outputs comprises transductor means provided with working winding means which possess a different number of turns for each transformer phase.

6. A welding rectification arrangement as defined in claim 4, wherein said taps of said primary winding means of said transformer means which can be selectively coupled with said switch means possess a different number of turns in each transformer phase.

7. A welding rectification arrangement as defined in claim 4, wherein said taps of said primary winding means of said transformer means which can be selectively coupled with said switch means possess the same number of turns for each transformer phase, whereby the different transformer winding ratios in the individual transformer phases can be regulated by said switch means.

8. A welding rectification arrangement as defined in claim 1, wherein said transformer means incorporates secondary winding means provided with selectable taps, said means for adjusting the amplitudes of said half-wave outputs comprising switch means capable of being selectively coupled with given ones of said taps, said taps of said secondary winding means possessing the same number of turns.

9. A welding rectification arrangement as defined in claim 8, wherein said taps of said secondary winding means possess a different number of turns.

10. A welding rectification arrangement as defined in claim 5, wherein said transformer means incorporates secondary winding means, said working winding means of said transductor means being arranged in each transformer phase of said secondary winding means, the number of turns of each said working winding means being different.

11. A welding rectification arrangement as defined in claim 1, wherein said transformer means comprises two single-phase transformers, a voltage supply means for each single-phase transformer, the voltages supplied to said two single-phase transformers being phase displaced at least 30° with respect to one another.

12. A voltage rectification arrangement as defined in claim 1, wherein said impedance means coupled with each output phase are at least partially formed of saturatable reactances for influencing the shape of the half-waves.

13. A welding rectification arrangement as defined in claim 12, wherein said saturatable reactances comprise choke coil means with particle oriented laminated core means.

14. A welding rectification arrangement as defined in claim 1, wherein said impedance means coupled with each output phase are provided with switch means and taps which can be optionally selected via said switch means.

15. A welding rectification arrangement comprising transformer means having a plurality of inputs and outputs, at least said outputs being of different phase, rectifier means coupled with said transformer means to produce half-wave outputs for each output phase, means provided for each output phase which are regulatable independently of one another for adjusting a previously predetermined current amplitude relationship between the individual half-wave outputs, and impedance means coupled with each output phase, said impedance means being variable independently of one another for influencing the shape of the half-wave outputs.

16. A welding rectification arrangement as defined in claim 15, wherein said previously predetermined current amplitude relationship between the individual half-wave outputs is an asymmetrical relationship.

17. A welding rectification arrangement as defined in claim 15, wherein said means for adjusting the current amplitudes of said half-wave outputs comprise adjustable impedance elements.

18. A welding rectification arrangement as defined in claim 17, wherein said adjustable impedance elements comprise saturatable reactances.

19. A welding rectification arrangement comprising transformer means having a plurality of inputs and outputs, at least said outputs being of different phase, rectifier means coupled with said transformer means to produce half-wave outputs for each output phase, means provided for each output phase which are regulatable independently of one another for producing an asymmetrical current amplitude relationship between the individual half-wave outputs.

20. A welding apparatus adapted to be connected to a welding electrode, said apparatus comprising:
  polyphase transformer means having an $n$-phase alternating current secondary circuit output, $n$ being an integer;
  rectifier arrangement means coupled with said $n$-phase alternating current secondary circuit output and adapted to be connected to said welding electrode, said rectifier arrangement means comprising branch circuits conducting half-wave current;
  impedance means connected in at least $n-2$ phases of said alternating current secondary circuit output prior to said rectifier arrangement means;
  disconnectable impedance means provided in at least one branch circuit of said rectifier arrangement means, whereby said disconnectable impedance means conducts only said half-wave current of said at least one branch circuit; and
  said impedance means and said disconnectable impedance means being dimensioned for providing a welding current output from said rectifier arrangement means comprising at least three amplitude values, each value differing from one another, said at least three amplitude values periodically following one another as a function of the frequency of the network and the number of said phases.

21. An apparatus as defined in claim 20, wherein said impedance means connected in said at least $n-2$ phases of said alternating current secondary circuit output are primarily inductive reactors.

22. An apparatus as defined in claim 20, wherein said impedance means connected in said at least $n-2$ phases of said alternating current secondary circuit output are primarily capacitive reactors.

23. An apparatus as defined in claim 20, wherein said impedance means connected in said at least $n-2$ phases of said alternating current secondary circuit output are constructed as LC-circuit.

24. An apparatus as defined in claim 20, wherein said impedance means connected in said at least $n-2$ phases of said alternating current secondary circuit output are constructed as transductors.

25. An apparatus as defined in claim 20, wherein said disconnectable impedance means provided in said at least one branch circuit of said rectifier arrangement means is primarily an ohmic resistor.

26. An apparatus as defined in claim 20, wherein said disconnectable impedance means provided in said at least one branch circuit of said rectifier arrangement means is primarily an inductive reactor.

27. An apparatus as defined in claim 20, wherein said disconnectable impedance means provided in said at least one branch circuit of said rectifier arrangement means is primarily a transductor.

28. An apparatus as defined in claim 25, wherein said ohmic resistor is adjustable, whereby the average output voltage of the entire apparatus can be changed by several volts.

29. An apparatus as defined in claim 20, wherein said at least three amplitude values of said welding current comprises a base amplitude, an auxiliary amplitude and a main amplitude, said impedance means and said disconnectable impedance means being dimensioned for constraining said main amplitude to be in the range of 2 to 10 times the value of said base amplitude and for constraining said auxiliary amplitude to be in the range of 1.2 to 7 times the value of said base amplitude.

30. An apparatus as defined in claim 20, wherein said impedance means connected in said at least $n-2$ phases of said alternating current secondary circuit output possess cores formed of grain-oriented sheet metal, whereby the ratio of the value of said main amplitude with said auxiliary amplitude is automatically changed from essentially 4 to 1 to essentially 1 to 1 and the curve shapes of said amplitudes are influenced.